Figure 1:
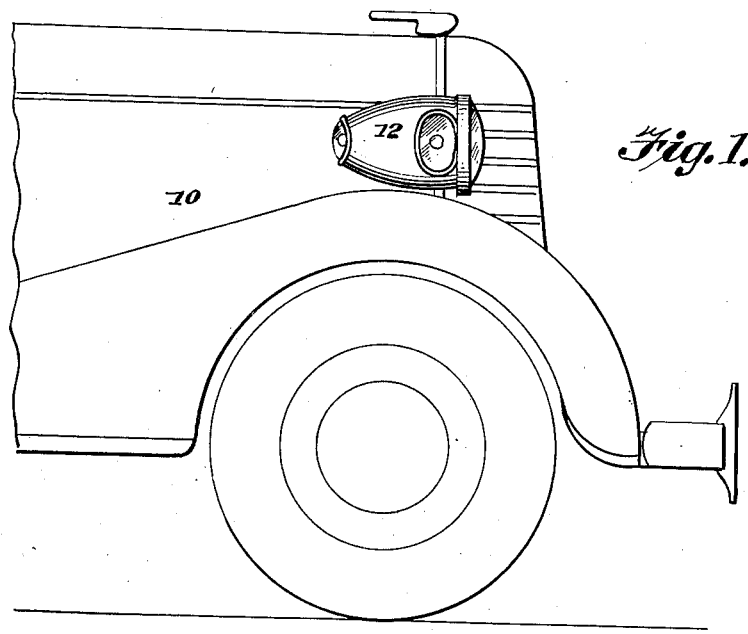

May 14, 1940.    G. H. BRUINGTON    2,201,078
SAFETY LIGHT SWITCH
Filed Sept. 4, 1937    2 Sheets-Sheet 1

Inventor
G. H. Bruington
By L. Edw. Slahity
Attorney

May 14, 1940.  G. H. BRUINGTON  2,201,078
SAFETY LIGHT SWITCH
Filed Sept. 4, 1937   2 Sheets-Sheet 2
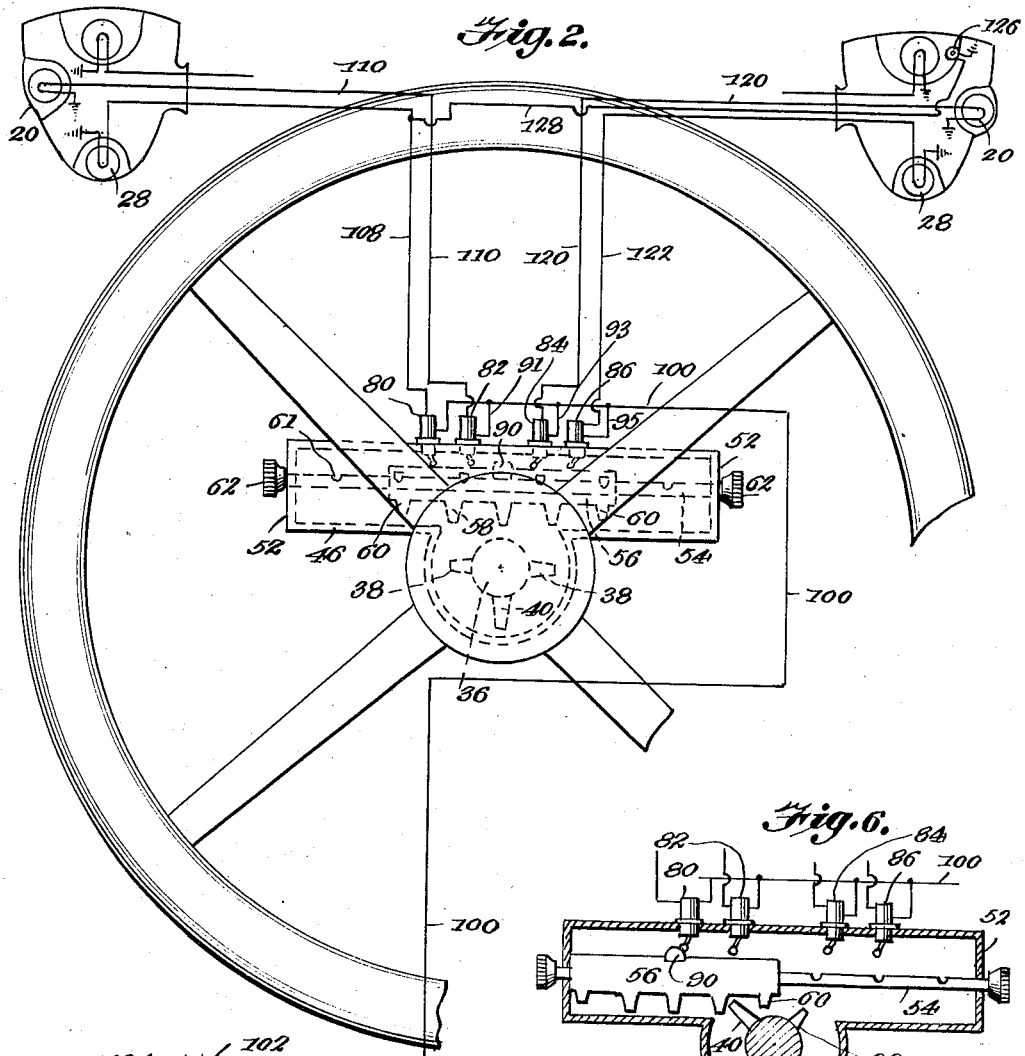
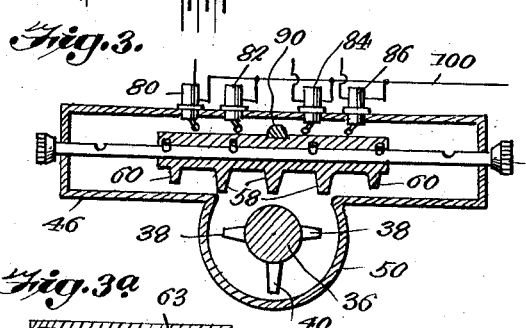
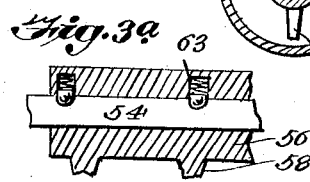
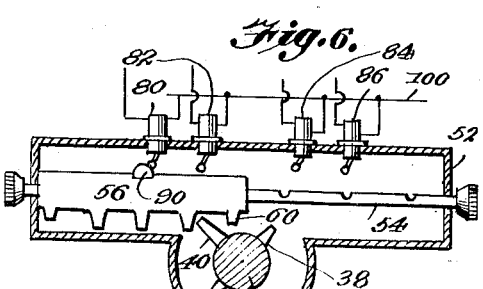
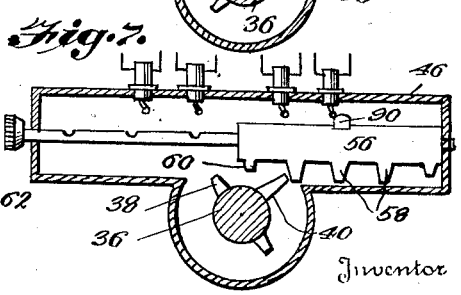
Inventor
G. H. Bruington Patented May 14, 1940

2,201,078

UNITED STATES PATENT OFFICE 2,201,078

SAFETY LIGHT SWITCH

George H. Bruington, Santa Fe, N. Mex.

Application September 4, 1937, Serial No. 162,481

1 Claim. (Cl. 200—59)

The present invention relates to a safety light and more particularly to a lighting system of this character which is especially adapted for use in connection with motor vehicles, velocipede and the like.

One of the objects of the present invention is to provide in combination with a motor vehicle means for illuminating the road while the vehicle is moving around a curve or deviating from the straight line travel.

A still further important object of the invention is to provide in combination with the curve eliminating means a safety light on the rear of the vehicle indicating to drivers of following vehicles that the operator is turning out of traffic either to right or left.

A still further important object of the invention is to provide novelly constructed means adapted to be actuated by the steering mechanism of the motor vehicle for effecting deenergizing of the electric circuit in which, the illuminating means for illuminating the curve and the safety light are connected.

A still further important object of the invention, is to provide the afore-mentioned combined curve illuminating means and the safety signal with means for permitting a time lapse between the disconnecting of the safety illuminating means and the deenergizing of the curve illuminating means.

In the accompanying drawings wherein similar reference numerals designate corresponding parts throughout the same.

Figure 1 is a fragmentary side elevational view of a motor vehicle showing for the purpose of illustration the illuminating means arranged on the usual headlights of the motor vehicle, Figure 2 is a schematic diagram showing the electrical connection and the control mechanism for energizing the same, Figure 3 is a transverse vertical sectional view of the housing in which the rack and pinion mechanism is enclosed for controlling the closing of the electrcal contact associated therewith for energizing the respective electrical circuit, Figure 3a is a fragmentary vertical sectional view showing the rack and shaft construction.

Figure 4:
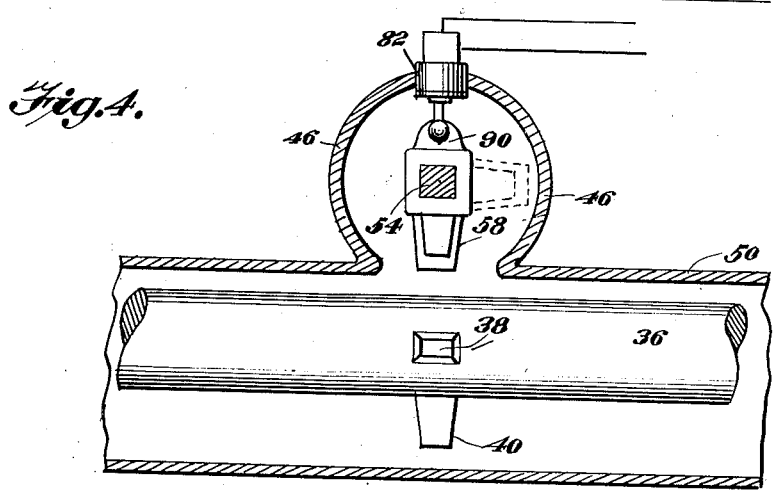
Figure 5:
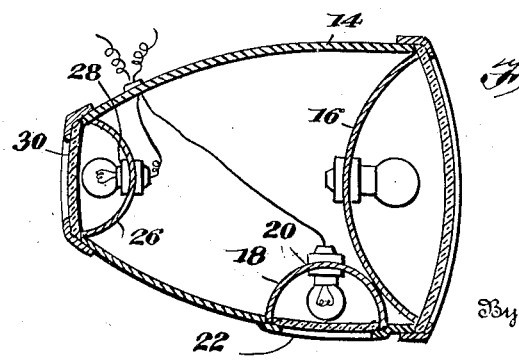

Figure 4 is a fragmentary vertical sectional view taken through the housing and the housing of the steering post, Figure 5 is a vertical sectional view of one of the headlamps embodying the safety illuminating means and the curve illuminating light, Figure 6 is a transverse vertical sectional view of the pinion and rack housing showing the position of the same and a full left turn of the motor vehicle wheels, and Figure 7 is a similar view showing the position of the rack and pinion gears for a full right turn of the motor vehicle wheels.

In the accompanying drawings wherein for the purpose of illustration there is shown a preferred embodiment of the invention, the reference numeral 10 generally designates the front portion of a motor vehicle, such as a pleasure car, truck or the like on which there is mounted a headlight 12. It is to be noted in this connection that the present invention is applicable not only to motor vehicle trucks but also motorcycle engines, bicycles and any other moving conveyance.

Referring to Figure 5 it will be seen that the headlight is provided with the usual casing 14 having a reflector 16 therein and an electric bulb for illuminating the forward portion of the roadway in the usual manner. In the outer side of the casing 14 there is secured a substantially semi-circular reflector 18 in which there is mounted an incandescent bulb 20. The casing as clearly illustrated is apertured and a lens 22 covers the opening, the rays of light from the incandescent bulb being directed upon the side of the road thereby illuminating the same. A similar semi-circular reflector 26 is secured to the rear portion of the casing 14 and has arranged in the usual manner therein an incandescent bulb 28. A lens 30 is secured in the casing and may be of red color directing, upon illumination of the bulb 28, the rays of light rearwardly defining what may be termed a safety light for signalling to approaching drivers as will be hereinafter more fully described the intention of the direction of turning of the motor vehicle by the operator. Each headlight is shown for the purpose of illustration to be of the same construction although if so desired they may obviously be of any other construction and it is to be noted further that if so desired the curve illuminating means and the safety light may be placed at any desired location on the vehicle.

Referring now to Figure 3 it will be observed that the steering post 36 of the motor vehicle is provided with horizontally disposed diametrically opposed cogs 38 and a centrally disposed cog 40. In the normal straight line position of the wheels of the motor vehicle the cogs 38 are horizontal and the cog 40 in depending vertical position, the cogs 38 being shorter than the cog 40. A horizontally extending substantially cylindrical-shaped casing 46 is either formed integral with the housing 50 surrounding the steering shaft 36 or secured thereto as clearly shown. The bottom central portion of the cylindrical housing 46 or casing is provided with a slot which is in registering engagement with a transverse slot or opening in the housing 50 through which the cogs 38 and 40 upon rotation of the shaft 36 project. The ends 52 of the casing 46 are provided with centrally disposed apertures in which there is rotatable a shaft 54 carrying thereon a slidable rack 56. The rack is provided on its underneath surface with integral spaced teeth the central teeth 58 being longer than the outer teeth 60 for a purpose to be more fully hereinafter described. It will now be seen that the shaft 54 is rectangularly shaped in vertical cross section and that the rack 56 is slidable thereon. The shaft 54 in the upper surface thereof is provided with six equally spaced indentures 61 therein into which there is received the spring-pressed projection 63 disposed in the upper portion of the rack. It will thus be apparent that as the rack is moved longitudinally of the shaft 54 the same is firmly secured in predetermined position thereon. The projecting free ends of the shaft 54 are screw-threaded and have screw-threaded thereon knobs 62 to the end that when it is desired not to use the present device the shaft may be rotated clockwise to the position illustrated in Figure 4 moving the teeth of the rack out of the path of the cog making the same inoperative. In the upper portion of the casing there are arranged spaced pairs of apertures in which there are suitably secured snap switches 80, 82, 84 and 86, the operating levers of which depend within the housing as clearly illustrated. A centrally disposed upstanding switch actuating trip 90 is provided on the upper surface of the rack 56 and upon longitudinal sliding movement of the rack 56 is adapted to engage the switch levers of the switches to open and close the same. The switches in the normal central position of the rack are in their closed position and upon a right hand sliding movement of the rack through the medium of the cooperating cogs 38 upon rotation of the steering post the switch trip as clearly shown in Figure 7 will engage the switch lever of switch 84 closing the switch and upon a continued right hand movement will pass thereunder engaging the switch lever of switch 86 closing switch 86. Upon the reverse left hand movement switch 86 will first be opened and upon continued movement switch 84 will be opened. Similarly switches 80 and 82 will be opened and closed upon a left hand movement of the rack 56.

It is not thought necessary to specifically disclose the structure of the switches, inasmuch as they are of the single throw type provided with a pair of contacts.

Referring to Figure 2 it will be seen that one of the contacts of switch 80 is connected by means of conductor 108 to one terminal of the safety illuminating lamp 28 the other terminal of lamp 28 being connected to ground. The other terminal of switch 80 is connected by means of conductor 100 to one terminal of the source of electrical supply 102 the other terminal of the source of electrical supply 102 being connected by a conductor 104 to ground. One terminal of switches 82, 84 and 86 are respectively connected by means of conductors 91, 93 and 95 to conductor 100. The other terminal of switch 82 is connected by means of conductor 110 to one terminal of the curve road illuminating lamp 20. The other terminal of this lamp being connected to ground. The other terminal of switch 84 is connected by means of conductor 120 to one terminal of curve illuminating lamp 20 in the other head lamp the right hand terminal of this lamp being connected to ground. The other terminal of switch 86 is connected by means of conductor 122 to one terminal of the safety illuminating bulbs 28 disposed in the right hand headlamp, the other terminal of lamp 28 being connected in the usual manner to ground. As will be observed an electric socket is provided in the reflector 16 and has screw-threaded therein a red bulb 126 which bulb upon being illuminated is adapted to indicate turn off to the left across traffic. This bulb has one of its terminals grounded and is connected by means of conductor 128 to conductor 108.

In the operation, during normal straight line travel the rack is disposed centrally on its shaft 54 the switch actuating trip 90 being disposed centrally between the switches 82 and 84. Upon a right hand turn by the driver of the vehicle the steering shaft 36 is obviously rotated in a clockwise direction, the cogs 38 engaging the teeth of the rack moving the rack slidably in a right hand direction causing the trip 90 to move the switch lever of switch 84 thereby energizing and illuminating the right hand road incandescent bulb 20. Upon a further turn the rack is moved to the position where the switch trip engages the lever of switch 86 closing this switch and energizing the right hand safety illuminating bulb 28. At this point it will be observed that the curve illuminating means 20 of the right hand headlamp and the safety illuminating means 28 are both energized. When the steering post is moved in an anti-clockwise position to return the vehicle toward its straight line travel the projection 90 operates the lever of switch 86 opening this circuit and deenergizing safety bulb 28 permitting at this point of the continued energization of curve illuminating bulb 20. Upon a further movement of the rack toward its central straight line position the lever of switch 84 is moved to open the contact of switch 84 deenergizing curve illuminating bulb 20. It is to be noted in this connection that by virtue of the relative length of cogs 38 and cogs 40 as clearly illustrated in Figure 7 after the rack 56 has been moved to its remote right hand position where the switches 84 and 86 have both been actuated to energize the curve illuminating means 20 and the safety illuminating means 28 of the right hand headlamp that the steering post is permitted to rotate starting the vehicle to be moved back to its straight line position the rack 56 remaining at this remote position until the long cog 40 engages the short tooth 60 of the rack. This produces at time lapse permitting of the curve illuminating means and the safety illuminating means at this point to be simultaneously energized. Upon a continued rotation of the steering wheel to move the vehicle in its straight line travel the short cogs 38 will then engage the longer teeth 58 of the rack moving the same to its central normal position. The same operation is effected when making the turn in the other direction, it being obvious that the spring-pressed projections 63 in the rack engage the indentures 61 retaining the same in their relative positions until being moved by the cooperating cogs and teeth. At this point it is thought well to note that upon an extreme left hand turn and the consequent actuation of the lever of switch 80 causing a turn out to the left across traffic the red incandescent bulb 126 in the right hand headlamp is simultaneously energized with the left hand safety illuminating bulb 28.

While there is shown for the purpose of illustration the illuminating means arranged in the headlamp it is obvious that the same may be positioned anywhere on the motor vehicle and it is to be understood that the invention is capable of various changes and modifications without departing from the spirit and scope thereof, and it is intended, therefore, that only such limitations shall be imposed thereon as are indicated in the prior art or in the appended claim.

Having described the invention, what is claimed as new is:

In combination with the steering mechanism of a vehicle, a casing having a slidable rack therein, the outer tooth on each end of the rack being shorter than the centrally disposed teeth, the steering post of the steering mechanism having three cogs thereon disposed 90° apart, the oppositely disposed cogs being shorter than the other cog and in the normal straight line driving position of the steering post the longer cog being disposed in its lowermost position, said cog cooperating with the teeth of the rack for effecting a movement thereof upon rotation of the steering post, spaced pairs of switches in said casing, and a switch trip secured to said rack normally out of engagement with the switches when the steering post is in position for straight line travel of the vehicle and adapted upon movement of the steering post for a right or a left hand turn to selectively actuate each of the pairs of switches.

GEORGE H. BRUINGTON.